United States Patent Office 3,128,362
Patented Apr. 7, 1964

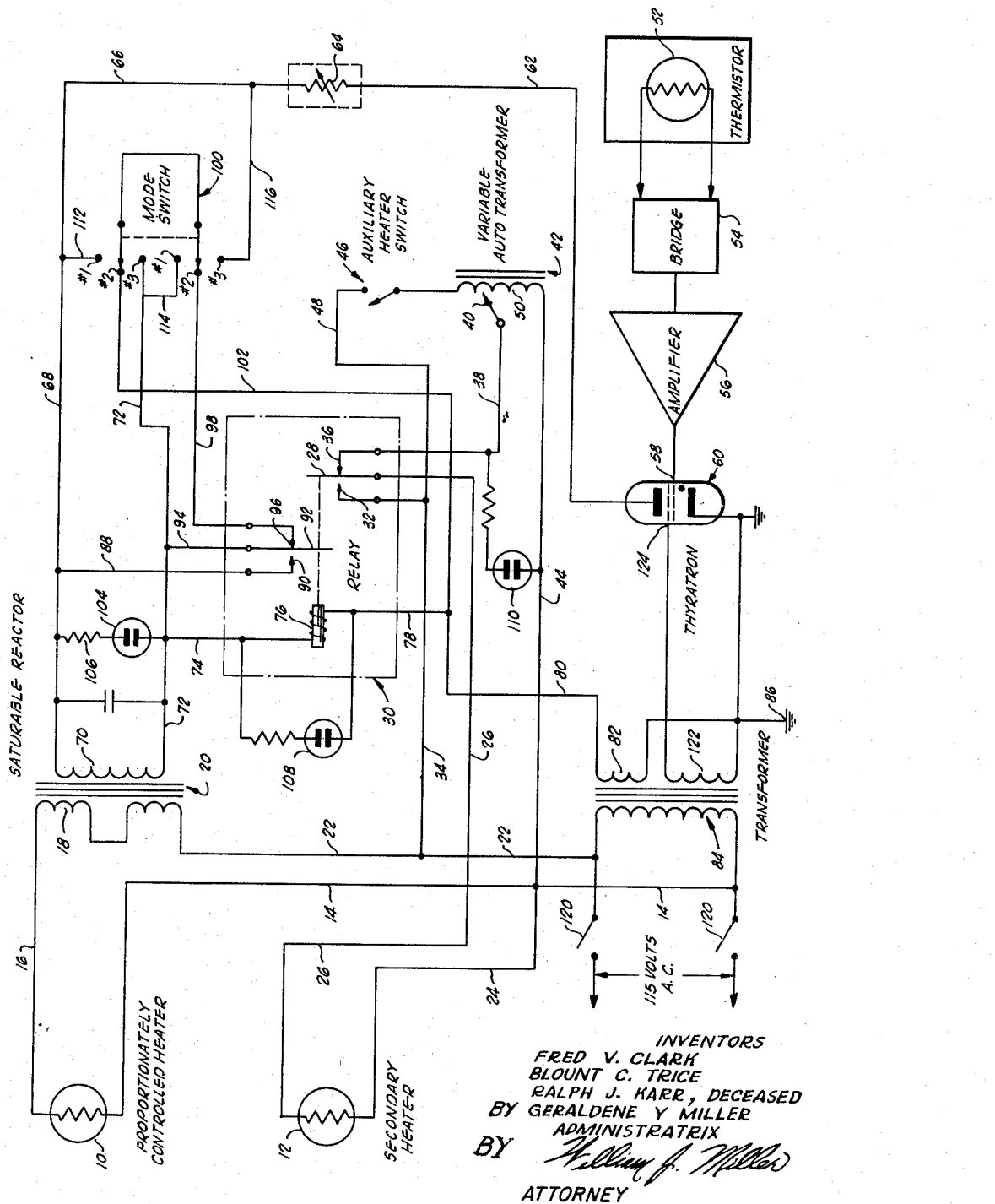

3,128,362
HEATER CONTROL SYSTEM
Fred V. Clark and Blount C. Trice, Ponca City, Okla., and Ralph J. Karr, deceased, late of Ponca City, Okla., by Geraldene Y. Miller, administratrix, Ponca City, Okla., assignors to Continental Oil Company, Ponca City, Okla., a corporation of Delaware
Filed May 25, 1962, Ser. No. 186,277
6 Claims. (Cl. 219—20)

The present invention relates to automatic control systems for electrically heated ovens and the like, and more particularly, but not by way of limitation, relates to a control system for an oven heated by both a relatively low wattage, proportionally controlled heating element and by a relatively high wattage, "on-off" booster type heating element.

As is known in the art, in most cases where it is desired to maintain an oven at a constant high operating temperature for tests or experimental purposes, greater temperature control can be obtained by the so-called proportionately controlled heating element. This type heating element is electronically controlled so that the element is heated only in proportion to the magnitude of the difference between the actual temperature and the desired operating temperature of the oven. The proportionately controlled heating elements presently in existence have a low maximum heating capacity and usually require several hours to heat an oven from room temperature to operating temperature and thereby cause inconvenient delays when placing an oven in operation. Booster heating elements having greater heating capacities have been used to more quickly heat the ovens to operating temperatures, but heretofore operation of the booster heater was either done manually by the operator or required separate, expensive control equipment for controlling the booster heating element.

Further, the proportionally controlled heater must inherently be of relatively low wattage in order to accurately maintain a constant temperature and usually does not have sufficient capacity when energized alone to maintain the oven at very high temperatures, such as 300° C. for example. In such a case, some type of auxiliary heater is required to continually supply a sufficient quantity of heat to maintain the oven at some temperature less than the particular high temperature desired, and the proportionally controlled heating element may then be used to supply the additional heat required to accurately maintain the oven at the selected high temperature.

It is contemplated by the present invention to provide automatic control circuitry having both a proportionally controlled heating element and a secondary heating element which serves both as a booster heater and an auxiliary heater such that the apparatus has the following modes of operation. The secondary heating element may be energized to rapidly heat the oven from room temperature to a preselected operating temperature. When the oven has been heated to the desired operating temperature, the secondary heating element will automatically be deenergized and the proportionately controlled heating element will be automatically energized to maintain the oven at a desired preset temperature without further assistance from the operator. In the event the proportionately controlled heating element is unable to maintain a desired oven temperature, the secondary heating element may be continuously operated at a selected level to serve as an auxiliary heater which, in conjunction with the proportionately controlled heating element, will maintain the oven at a constant high operating temperature. Further, the secondary heating element may be utilized as an "on-off" type heater which is switched full "on" or full "off" by the circuitry in response to temperature sensing means in order to maintain a constant oven temperature as desired.

Therefore, it is an important object of the present invention to provide a completely automatic system for quickly heating an oven to a desired, preselected operating temperature and thereafter accurately maintaining the oven at the operating temperature.

Another very important object of the present invention is to provide a system of the type described which requires only one temperature sensing element and associated electronic control circuitry to automatically operate only two heating elements in the manner described.

Another object of the present invention is to provide a system of the type described wherein neither the proportionately controlled heating element or the secondary heating element when used as a booster can be energized unless the control system is operating and senses a difference between the actual temperature in the oven and the desired operating temperature.

Still another object of the present invention is to provide a system of the type described wherein the secondary heating element may be operated as an auxiliary heater for assisting in maintaining the oven at a temperature higher than that which can effectively be maintained only by the proportionately controlled heating element.

Yet another object of the present invention is to provide a system of the type described wherein the power supplied to the secondary heating element when utilized as an auxiliary heater may be manually selected by the operator.

Another object of the present invention is to provide a control system of the type described which has a minimum of parts, can be economically constructed, and can be easily and safely operated with a minimum of supervision.

Additional objects and advantages will be evident from the following detailed description and drawing wherein:

The single figure is a schematic electrical circuit diagram of an oven heating system constructed in accordance with the present invention.

Referring now to the drawing, a portionately controlled heating element 10 and a secondary heating element 12 are physically located in such relationship to an oven (not shown) as to efficiently heat the oven when energized. The proportionately controlled heating element 10 is energized from a suitable alternating current source (not shown) through a circuit comprised of conductor 14, conductor 16, the power winding 18 of a saturable iron core reactor 20, which functions as a power amplifier as hereafter described in greater detail, and conductor 22.

The secondary heating element 12 is energized, when utilized as a booster heater, form the alternating current power source through circuitry comprised of the conductor 14, a conductor 24, a conductor 26, the switch blade 28 of a relay 30 to be hereafter described in greater detail, contact 32 of the relay 30, a conductor 34 and the conductor 22. When the secondary heating element 12 is utilized as an auxiliary heater, the heating element is energized through the circuitry comprised of the conductors 14, 24 and 26, the switch blade 28 and contact 36 of the relay 30, a conductor 38, the movable contact 40 of a variable auto transformer 42 and conductor 44. Of course, current will not be induced in this circuit until the circuit through the variable auto transformer 42 is completed by closing a manual switch 46, in which case the circuitry of the auto transformer will comprise the conductor 34, a conductor 48, the switch 46, the coils 50 of the auto transformer 42 and the conductor 44.

A conventional thermistor 52 is located in the oven for sensing the temperature of the oven and comprises one resistor of a conventional bridge 54. The bridge 54 is provided with a manually variable resistor (not shown) for adjusting the temperature at which the bridge will be balanced in a manner well known in the art. An amplifier 56 amplifies any unbalance in the bridge 54 and applies the output to a control grid 58 of a thyratron tube 60. The cathode and plate of the thyratron 60 are connected in a series control circuit comprising generally a conductor 62, a variable resistor 64, a conductor 66, a conductor 68, the control winding 70 of the saturable reactor 20, a conductor 72, a conductor 74, the actuating coil 76 of the relay 30, a conductor 78, a conductor 80, and a secondary winding 82 of a transformer 84, and back to ground 86.

A shunting circuit around the control winding 70 of the saturable reactor is comprised of a conductor 88, a contact 90 of the relay 30, the switch blade 92 of the relay 30, and a conductor 94 which is connected to the conductor 72. This shunting circuit around the control winding 70 also serves as a holding circuit for maintaining the actuating coil 76 of the relay 30 energized as hereafter described. A shunting circuit around the actuating coil 76 of the relay 30 is comprised of the conductor 94 and switch blade 92, a contact 96 of the relay 30, a conductor 98, the mode #2 contacts of a three position, double blade mode switch indicated generally by the reference numeral 100, and a conductor 102 which is connected to the junction between the conductors 78 and 80.

The relay 30 is illustrated in the normal position which for purposes of this disclosure shall be taken to mean when the actuating coil 76 is deenergized. Therefore, it will be noted that when the coil 76 is deenergized, the switch blade 92 will close against the contact 96 to open the shunting circuit around the control winding 70 of the saturable reactor 20 and to close the shunting circuit around the actuating coil 76 of the relay 30. It will also be noted that the switch blade 28 closes against the contact 36 to open the direct power circuit or booster circuit to the secondary heating element 12 and to close the circuit including the secondary heating element 12 and the variable auto transformer 42. Of course, the auto transformer is not energized until the switch 46 is closed to complete the circuit.

A neon indicator lamp 104 is connected through a large resistor 106 in shunt around the control coil of the saturable reactor for indicating when the saturable reactor 20 is energized. Similarly, an indicator lamp 108 is connected in shunt around the actuating coil 76 of the relay 30 to indicate when the relay is energized and consequently when the secondary heating element 12 is being utilized as a booster heater. A third indicator lamp 110 may be connected substantially as shown to indicate when the secondary heating element 12 is being utilized as an auxiliary heater.

The mode switch 100 has three positions herein termed modes #1, #2 and #3 as represented by the pairs of contacts indicated by the reference characters #1, #2 and #3, respectively. When the mode switch 100 is switched to mode #1, the shunting circuit around the actuating coil 76 of the relay 30 is opened, and the actuating coil 76 is energized through a conductor 112, mode contacts #1, a conductor 114, and the conductors 72, 74 and 78. The mode switch 100 is spring biased so that when the mode switch is manually moved to mode position #1 it will automatically return to mode position #2. As previously mentioned, when the mode switch is at mode #2, as indicated in the drawings, the shunting circuit around the actuating coil 76 will be closed, provided the coil is deenergized and contact 96 is closed. When the mode switch 100 is moved to mode position #3, the actuating coil 76 of the relay 30 is directly energized through a conductor 116, mode contacts #3, and conductors 72, 74, 78 and 80, etc. Therefore in mode position #3, whenever the thyratron tube 60 is conducting the relay 30 will be energized so that the secondary heating element 12 will be energized and operated as an "on-off" type heating unit to maintain a constant temperature in the oven as hereafter described. A master switch 120 may be provided for energizing the device.

*Operation*

Assume now that the oven is cold and the control system is not in operation. The switch 46 should be open and the mode switch 100 should be in mode position #2. When the master switch 120 is closed, electrical power will be available to the heating elements 10 and 12. However, no power will be immediately supplied to the secondary heating element 12 because the relay 30 is deenergized and the contact 32 is open, and although the contact 36 is closed, the switch 46 is opened so that the variable auto transformer 42 is not energized. Similarly, no current is immediately available to the proportionately controlled heating element because the saturable iron core reactor 20 constitutes a prohibitive impedance until such time as the control coil 70 is energized. The operation of the saturable iron core reactor 20 as a proportional switching device or amplifier is based upon the hysteresis loop of the iron core of the reactor and the function of this type of device is well known in the art. The heating element 10 is characterized as a proportionately controlled heater because the conductance of the saturable iron core reactor 20 is proportional to the current in the control winding 70, which in turn is proportional to the difference between the actual temperature and the desired operating temperature of the oven, as will hereafter be described in greater detail.

When the master switch 120 is closed, the primary winding of the transformer 84 is energized which by means of the secondary windings 82 energizes the control circuit including the thyratron tube 60 previously described. It will also be noted that the secondary windings 122 are energized to apply a control potential to a second grid 124 of the thyratron tube 60 in the conventional manner. Next the desired operating temperature is set in the bridge circuit 54. Since the oven is assumed to be at room temperature, the thermistor 52 will immediately sense a substantial difference between the desired operating temperature and the actual oven temperature. This difference will be fed to the amplifier 56 and the amplified signal applied to the control grid 58 of the thyratron tube 60. The thyratron tube 60 will then conduct a portion of a half cycle of the alternating current induced in the secondary winding 82 of the transformer 84. The firing and extinction points of each conductive half cycle are dependent upon the voltage applied to the control grid 58 so that the total current conducted through the thyratron tube 60 is proportional to the unbalance of the bridge 34 and is, therefore, proportional to the difference between the actual temperature and the desired temperature of the oven.

As a result of conductance of the thyratron tube 60, when the mode switch is in mode position #2, current will pass through the control circuit comprised of conductors 62, 66 and 68, the control winding 70 of the saturable reactor, conductor 72, through the shunting circuit around the actuating coil 76 comprised of the conductor 94, the switch blade 92, the contact 96, the conductor 98, the #2 mode contacts of the mode switch 100, the conductors 102 and 80, and the secondary winding 82 of the transformer 84. This current will tend to saturate the iron core of the saturable reactor 20. As the iron core becomes saturated, its impedance is reduced and current is permitted to flow through the primary winding 18 of the reactor to the proportionately controlled heating element 10 in proportion to the current conducted by the thyratron tube.

However, since the capacity of the proportionately controlled heating element 10 must necessarily be relatively small in order to attain fine temperature control, it is desirable to rapidly heat the oven by means of the secondary heating element 12 which may be of any desired relatively high wattage. Therefore, it is desirable to switch the control system to booster mode of operation, which is accomplished by momentarily moving the mode switch 100 to mode position #1. The shunting circuit around the actuating coil 76 of the relay 30 through the mode contacts #2 will then be momentarily opened, and the circuit from the thyratron tube 60 through the mode contacts #1 and conductors 72, 74 and 78 will energize the actuating coil 76 of the relay 30. The switch blade 92 will then be moved to close against the contact 90, and the holding circuit for maintaining the actuating coil 76 energized will be closed through the conductor 88, the contact 90, the switch blade 92, the conductor 94 and the conductor 72. When the spring-loaded mode switch 100 is released, it will automatically return to mode position #2 preparatory to automatic proportionally controlled operation as hereafter described. However, the actuating coil 76 will continue to be energized through the holding circuit to hold the switch blade 28 against the contact 32.

When the relay actuating coil 76 is energized, the contact 32 is closed to apply full power to the secondary heating element 12 through the circuitry comprised of conductors 14, 24, 26, switch blade 28, contact 32, conductor 34 and conductor 22. The high wattage secondary heating element 12 will then function as a booster heater to more quickly bring the oven up to operating temperature. The holding circuit through contact 90 also acts to shunt the control winding 70 of the reactor 20 so that the proportionally controlled heating element will not be heated to maximum temperature, but instead is heated only to the desired temperature of the oven so that it is immediately ready to start accurate control of the oven temperature as hereafter described.

When the desired operating temperature of the oven is reached, the resistance of the thermistor 52 will have been increased sufficiently to balance the bridge 54 and cease the output from the amplifier 56 so as to turn the thyratron tube 60 off. No current will then flow through the control circuit previously described so that the actuating coil 76 of the relay 30 will be deenergized and the relay will "drop-out" or return to its normal position as illustrated. The holding circuit through the contact 90 will then be opened and the shunting circuit around the actuating coil 76 will be closed through the contact 96 and through the mode #2 contacts of the mode switch to insure that the relay 30 will not subsequently be energized. As the temperature of the oven decreases, a slight unbalance in the bridge 54 will be produced and the thyratron tube 60 will conduct a proportionate current. The control winding 70 of the saturable reactor 20 will then be energized slightly to cause a proportionate increase in current to the proportionately controlled heating element 10 to constantly apply only so much heat as is required to maintain the desired operating temperature. As is well known in the art, a constant temperature can be maintained with far greater accuracy by employing the proportionately controlled type of heating element.

Generally speaking, the smaller the total available wattage output of the proportionally controlled heating element 10, the greater the accuracy with which the desired temperature in the oven can be maintained. Accordingly, when it is desired to maintain the oven at extremely high temperatures, such as 300 C., considerably more heat than is available from the relatively small proportionately controlled heating element 10 is required. In such an event, the secondary heating element 12 may be utilized as an auxiliary heater to supply a fixed portion of the necessary total heat in the following manner. During mode #2 or proportionally controlled operation, the relay 30 is deenergized and the switch blade 28 is in the normally closed position against the contact 36. Therefore the circuit through the portion of the winding 50 of the variable auto transformer 42 is completed to the secondary heating element 12 through the conductors 26, 24, the winding 50, the movable contact 40, the conductor 38, the contact 36 and the switch blade 28. Therefore, when the system is in mode #2 operation, i.e., when the heating element 10 is being proportionately controlled, the secondary heating element 12 may be utilized as an auxiliary heater merely by closing the switch 46. A circuit will then be completed through conductors 14, 44, the winding 50, the switch 46, conductor 48, conductor 34 and conductor 22. Then, a current will be induced in the circuit comprised of the conductors 44, 24, 26, the switch blade 28 and contact 26, and the conductor 38. The magnitude of the current will be controlled by the setting of the sliding contact 40 of the variable auto transformer. With very little experience, the operator can effectively set the movable contact 40 in such a position as to energize the secondary heating element 12 only to an extent sufficient to maintain a temperature less than the desired operating temperature. Then the proportionately controlled heating element 10 will automatically and accurately provide the additional heat required to precisely maintain the desired temperature in the oven.

In some instances, it may be desirable to operate the secondary heating element 12 as an "on-off" type heater wherein full power is applied to the secondary heating element 12 whenever the temperature drops below the desired level and the secondary heating element 12 is completely turned off when the temperature is raised back to the desired operating level. This may easily be accomplished by opening the auxiliary heater switch 46 and moving the mode switch 100 to mode position #3. A control circuit will then be completed from the thyratron tube 60 through conductors 62 and 116 to mode position contacts #3, and through conductors 72 and 74 to energize the actuating coil 76 of the relay 30 whenever the thyratron tube 60 is conducting. The circuit is of course completed through conductors 80 and the secondary winding 82 to ground 86.

Therefore, when the thermistor 52 senses a difference between the actual temperature and the desired operating temperature of the oven, an unbalance in the bridge 54 will result and cause the thyratron tube 60 to conduct. The actuating coils 76 will then be energized to close the switch blade 28 against the contact 32 and directly energize the secondary heating element 12. When the temperature of the oven has been raised to the desired operating temperature, the bridge 54 will become balanced and the thyratron tube will cease to conduct and the relay actuating coil 76 will be deenergized. The switch blade 28 will then open from the contact 32 to deenergize the secondary heating element 12. Of course, it will be appreciated that due to the fact that the relay 30 must receive substantial current before closing the switch blade 28 against the contact 32, and the fact that the relatively large secondary heating element 12 may overrun the desired operating temperature while cooling after deenergization, the temperature of the oven cannot be maintained as accurately by this mode of operation as in the case of the small, proportionately controlled heating element 10. Nevertheless, in some instances it may be desirable to so operate the control system.

From the above detailed description, it will be evident to those skilled in the art that a highly useful control system for an electrically heated oven has been described. The oven can relatively quickly be heated by the relatively high wattage secondary heating element from room temperature to a desired operating temperature without attention from an operator. After the oven has reached the desired operating temperature, the temperature is automatically maintained constant with great accuracy by a proportionately controlled, low wattage heating element. In the event a very high operating temperature is desired, the secondary heating element may also be utilized in the manner of an auxiliary heater to supply a considerable portion of the heat required to maintain the high temperature. The proportionately controlled heating element will then supply the precision control necessary to accurately maintain the constant high temperature. If desired, the secondary heating element may also be utilized as an "on-off" type heater for maintaining the desired operating temperature, but with a lesser degree of accuracy.

Although the control system has three distinct modes of operation, any one of which may be selected by the operator, the control system uses but one temperature sensing, detecting and amplifying circuit, and only two heating elements. Therefore, it will be evident to those skilled in the art that the device is of very simple and reliable construction and may be economically manufactured and easily operated even by the inexperienced. It will also be noted that except for the auxiliary heater switch 46, neither of the heating elements can be energized unless the temperature sensing means detects a difference between the actual temperature of the oven and the desired operating temperature.

Having thus described a particular embodiment of the invention, it is to be understood that various changes and substitutions can be made therein without departing from the spirit and scope of the invention as defined by the appended claims.

What is claimed is:

1. A control system for an electrically heated oven having a proportionately controlled heating element and a booster heating element, the control system comprising:
   a control circuit having means for producing a current therein proportional to the difference between the actual temperature and the desired operating temperature of the oven;
   means responsive to the current in the control circuit for delivering electrical power to the proportionately controlled heating element in proportion to said current in the control circuit;
   a source of power;
   relay means having a first position for delivering full source power to the booster heating element responsive to said current in the control circuit, and having a second position when said relay is de-energized;
   circuit means for energizing said relay means to said first position to deliver power to the booster heating element until the oven is heated to the desired operating temperature and current no longer flows in the control circuit causing said relay to de-energize to said second position; and
   means for preventing subsequent energization of the relay means upon current subsequently being produced in the control circuit due to a difference in actual temperature and the desired operating temperature of the oven.

2. A control system for an electrically heated oven having a proportionally controlled heating element and a secondary heating element, the control system comprising:
   a series control circuit having means for producing a current in the series control circuit proportional to the difference between the actual temperature and the desired operating temperature of the oven, proportional power amplifier means responsive to the current in the control circuit for controlling the power delivered to the proportionally controlled heating element, and the coil of a relay all connected in series;
   said relay having a first set of normally open contacts connected, when closed by energization of the coil, to energize the secondary heating element;
   said relay having a second set of normally closed contacts connected in a shunting circuit to shunt the coil and prevent energization thereof;
   said relay having a third set of normally open contacts connected, when closed by energization of the coil, to close a holding circuit to maintain the coil energized; and,
   switch means having first position contacts connected to open the shunting circuit and permit energization of the coil
   whereby when the first position contacts are momentarily opened and the coil is energized, the first set of relay contacts will be closed to energize the secondary heating element, the second set of relay contacts will be opened to permit continued energization of the coil, and the third set of relay contacts will be closed to maintain the coil energized so long as current is flowing in the series control circuit, and, whereby upon the first cessation of the current in the series control circuit, the coil will be de-energized, the shunting circuit completed, and the holding circuit opened to prevent future energization of the relay coil and of the secondary heating element.

3. A control system as defined in claim 2 wherein:
   the holding circuit also shunts the proportional power amplifier means to prevent operation of the amplifier and thereby prevent energization of the proportionally controlled heating element during energization of the secondary heating element.

4. A control system as defined in claim 2 wherein the switch means has second position contacts for energizing the coil, and the switch means is spring-loaded to automatically return from the second position contacts to the first position contacts.

5. A control system as defined in claim 4 wherein:
   the switch means has third position contacts which may be alternately closed when said first and second position contacts are open, and
   further characterized by circuit means connected to the third position contacts for continually completing a circuit to the coil of the relay and continually shunting the amplifier means whereby the secondary heating element will be turned on and off responsive to a current in the series control circuit.

6. A control system as defined in claim 2 wherein:
   said relay has a fourth set of normally closed contacts,
   and further characterized by circuit means connected to the fourth set of normally closed contacts for energizing the secondary heating element when the relay coil is deenergized,
   the last mentioned circuit means including means for controlling the power applied to the secondary heating element.

References Cited in the file of this patent
UNITED STATES PATENTS

| | | |
|---|---|---|
| 1,183,925 | Waters | May 23, 1916 |
| 2,805,311 | Fluegel et al. | Sept. 3, 1957 |